No. 893,338. PATENTED JULY 14, 1908.
D. T. MacLEOD.
ORE DRIER.
APPLICATION FILED NOV. 5, 1907.

2 SHEETS—SHEET 1.

No. 893,338.

D. T. MacLEOD.
ORE DRIER.
APPLICATION FILED NOV. 5, 1907.

PATENTED JULY 14, 1908.

2 SHEETS—SHEET 2.

UNITED STATES PATENT OFFICE.

DANIEL T. MACLEOD, OF MERCHANTVILLE, NEW JERSEY.

ORE-DRIER.

No. 893,338.      Specification of Letters Patent.      Patented July 14, 1908.

Application filed November 5, 1907. Serial No. 400,831.

*To all whom it may concern:*

Be it known that I, DANIEL T. MACLEOD, a citizen of the United States, residing in Merchantville, New Jersey, have invented certain Improvements in Ore-Driers, of which the following is a specification.

The object of my invention is to so construct an ore drier that the waste heat from an ore roasting furnace can be used to dry the ore prior to its being introduced into the furnace.

My invention is so designed that it can be placed above one of the ordinary vertical types of ore roasting frunaces and the moving parts can be driven from the moving parts of the ore roasting furnace.

The details of the invention will be fully described hereafter, reference being had to the accompanying drawings, in which:—

Figure 2:
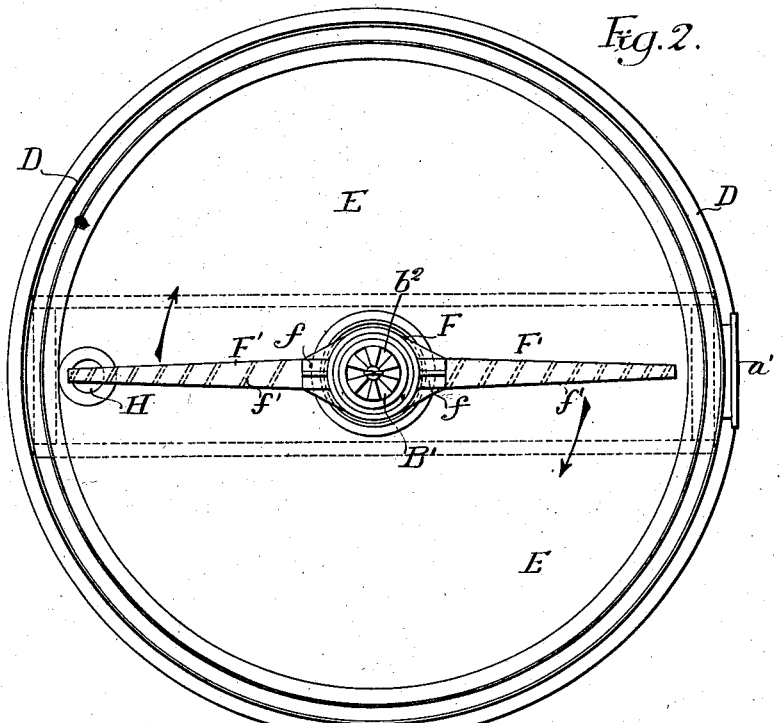
Figure 1:
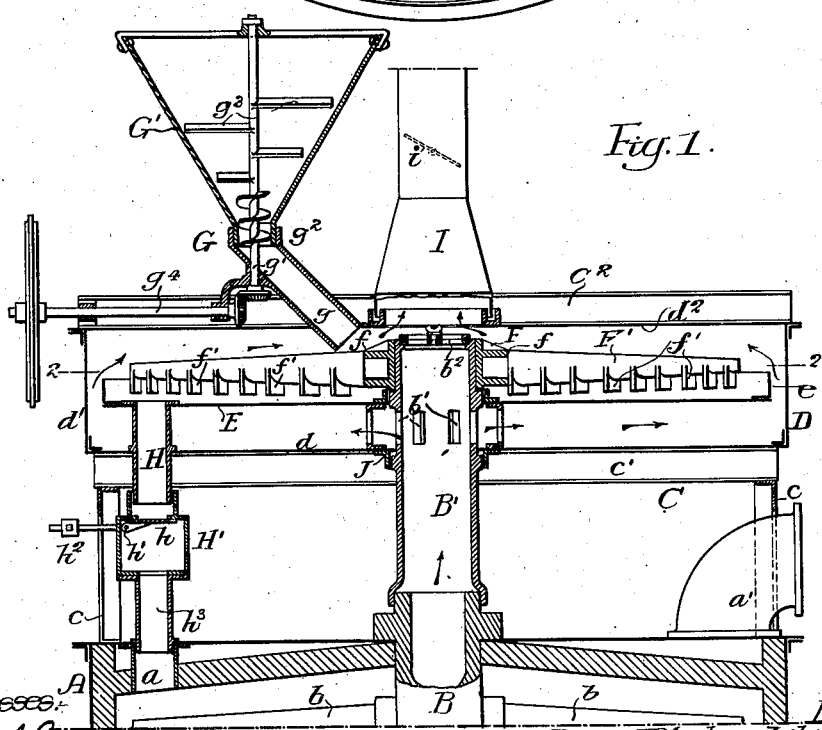
Figure 3:
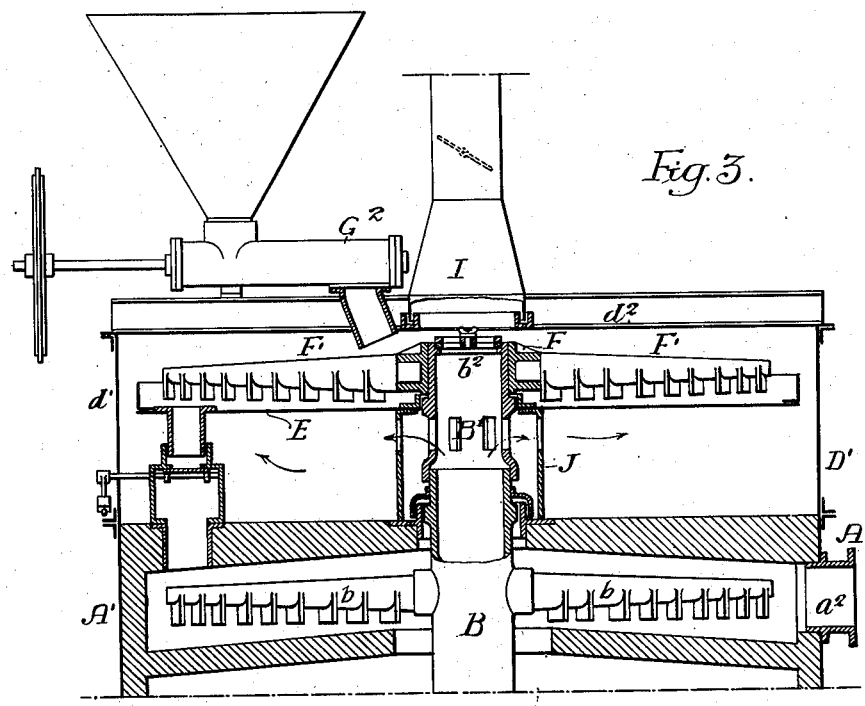
Figure 4:
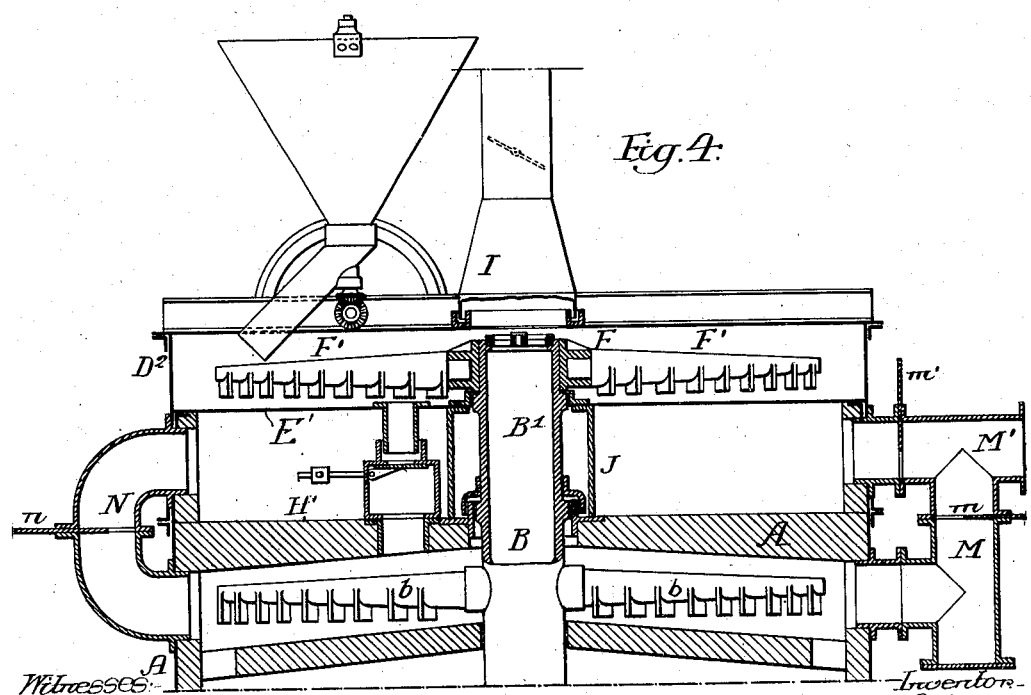

Figure 1, is a vertical sectional view of the upper portion of an ore roasting furnace showing my improved ore drier in position; Fig. 2, is a sectional plan view on the line 2—2, Fig. 1; and Figs. 3 and 4, are vertical sectional views illustrating modifications of the invention.

A is the body of an ore roasting furnace, B is a vertical shaft extending through the furnace and having the ordinary blades $b$ secured thereto, which convey the ore under treatment over shelves or platforms. This shaft B is hollow and is connected at its lower end with an air pipe and hot air from this shaft passes ordinarily out to waste at the upper end. By my invention I utilize this hot air for drying the ore prior to its being introduced into the ore roasting furnace.

C is a frame consisting of vertical members $c$ and horizontal members $c'$ which support a casing D, preferably made of sheet metal having a bottom $d$, sides $d'$ and a top $d^2$.

Mounted within this casing D is a tray or platform E having a flange $e$ at its outer edge, and forming a continuation of the hollow shaft B of the furnace is a hollow shaft B' which is coupled to the shaft B so that it will turn with it. This shaft extends through an opening in the bottom of the casing D and also through an opening in the pan E.

Secured to the upper end of the tubular shaft B' is a sleeve F having sockets $f$ for the reception of the ends of the blades F' which extend over the tray E; these blades have fingers $f'$, which are set at an angle in Fig. 1, for stirring and feeding the ore being treated either from the center to the periphery of the pan, or vice versa.

Mounted on the frame $c^2$ above the casing D is a material feeding device G consisting of a hopper G' and a spout $g$ communicating with the interior of the casing D, as in Fig. 1, near the center. A central shaft $g'$ has a feed screw $g^2$ situated in the neck of the hopper and arms $g^3$ in the body of the hopper so as to prevent the material clogging, and insuring positive feeding. The shaft $g'$ is geared to a shaft $g^4$ in the present instance, which has a sprocket wheel or pulley at its outer end which can be driven by any suitable mechanism. The spout can direct the material either to the center as shown in Fig. 1, or to the periphery as shown in Fig. 4, according to the direction of movement of the material in the casing.

H is a discharge pipe leading from the pan E near its periphery, in Figs. 1 and 3, through the bottom $d$ of the casing and into a valve box H' in which is a valve $h$ pivoted at $h'$ and having a weighted arm $h^2$, and this valve box connects with a feed opening $a$ of the furnace through a pipe $h^3$. The valve $h$ is so placed that as the material accumulates in the pipe H and upon the valve it will hold the material until its weighted arm is overbalanced when it will immediately open, allowing the material to pass through the feed opening and onto the first platform of the ore roasting furnace. The valve will immediately close, preventing furnace gases entering the casing D. The gas from the furnace passes out through the neck $a'$ in the ordinary manner.

Other mechanism for feeding the material to the furnace may be used without departing from the main feature of my invention.

Directly above the hollow shaft B' is a stack I, in the present instance having a valve $i$; this stack communicates with the interior of the casing D. The hollow shaft B' has openings $b'$ which allow for the escape of hot air from the shaft into the casing D, as indicated by the arrows. The bearing J for the shaft is also perforated for the passage of the hot air.

In the upper end of the shaft B' is a damper $b^2$; on opening this damper the full width all the air will pass directly from the hollow shaft B' to the stack I, and when the damper is partly opened only a small portion will enter the casing D and when the damper is entirely closed then all the hot air from the shaft passes into the casing D, consequently by regulating this damper any amount of hot air can be allowed to circulate through the chamber D.

The operation of the apparatus is as follows:—The damper $b^2$ is set to any degree desired and when the apparatus is set in motion the material is fed from the hopper G' onto the tray E and as the shafts B, B' rotate the blades F' travel over the pan, finally discharging the material through the pipe H, through the valve box onto the upper platform of the furnace A. The hot air passes from the hollow shaft B into the hollow section B' and then through the chamber D, as indicated by the arrows, passing directly under the pan E, heating the pan to such an extent as to dry the ore conveyed over the pan. The hot air then passes around the edges of the pan and over the ore, assisting in drying the ore turned over by the rake arms, taking with it any moisture which may pass from the ore, and carrying it up the stack I. The feed into the pan E is continuous, while the feed from the pan into the ore roasting chamber is intermittent, according as the valve $h$ is operated.

In Fig. 3, I have shown a slight modification of the device shown in Fig. 1; in this construction I reduce the height of the apparatus by mounting the casing D' directly on the upper portion of the body A' of the furnace and the outlet $a^2$ does not project above the upper surface of the body portion A'. The shaft B is shortened and the radiant heat from the top of the furnace is utilized with the heat from the central shaft.

In Fig. 3 I have shown a feeding device consisting of a cylinder $G^2$ having a hopper at one end and a spout at the other end communicating with the casing D. A feed screw in the casing is mounted on a shaft driven by a sprocket wheel or other suitable means.

In Fig. 4, I have shown a combination in which the pan E' forms the bottom of the casing $D^2$ and the space above the top hearth of the furnace communicates with the space between the pan and the upper portion of the body of the furnace through the passage N in which is a valve $n$.

At the opposite side of the furnace is a passage M forming communication between the upper hearth of the furnace and the outlet pipe M', and this outlet pipe also communicates with the space between the pan E' and the furnace, and valves $m$, $m'$ are provided for regulating the passage of the gas through these several pipes. By this arrangement any amount of furnace gas can be directed through the space between the pan of the drier and the body of the furnace, or the gas can be entirely cut off, as desired. The hot air from the hollow shaft B passes up to the stack and any moisture rising from the ore will be carried off by this hot air, due to stack draft.

In Fig. 4 the feeding mechanism discharges the material at the periphery of the table and the outlet to the furnace is near the center, as it will be understood that the material may be conveyed in either direction over the table.

The devices illustrated and described may be applied to furnaces now in use and in new furnaces the section B' may be made integral with the shaft B as in Fig. 4, and the top of the furnace may be made light, so as to gain all the advantages possible in the use of radiant heat.

I claim:—

1. The combination of an ore roasting furnace, a drier mounted above said furnace, a vertical hollow shaft extending through the ore roasting furnace and into the drier, means for rotating said shaft, a pan in the drier situated some distance above the top of the furnace so as to form a channel under the pan, openings in the hollow shaft communicating with the said channel so that the hot air passing through the hollow shaft will enter the drier between the pan and the top of the furnace, and means for feeding material to the drier, with a discharge opening from the drier communicating with the furnace, substantially as described.

2. The combination of an ore roasting furnace, a drier mounted above the furnace, a vertical hollow shaft extending through the furnace and into the drier, a pan mounted within the casing of the drier some distance under the bottom thereof so as to form a channel under the pan, openings in the hollow shaft communicating with the said channel, blades attached to the shaft adapted to travel close to the bottom of the pan, an outlet in the pan communicating with the furnace, and means for feeding material to the pan so that a continuous thin layer of material will flow over the pan to the outlet, substantially as described.

3. The combination in an ore roasting furnace, of a drier consisting of a casing having a pan mounted therein above the bottom of the casing so as to form a channel under the pan, a channel at the side of the pan and another channel above the pan, a vertical driven shaft in the furnace and extending into the drier, means for introducing a heated current of air into the channel above the pan, blades on the shaft, an outlet for the discharge of material from the pan, and means for feeding the pan with material, substantially as described.

4. The combination in an ore drier adapted to be mounted on an ore roasting furnace having a hollow vertical shaft, of a casing provided with a pan, a hollow shaft coupled to the shaft of the furnace, blades on the shaft adapted to travel over the pan, a stack communicating with the casing, a damper in the said hollow shaft for regulating the passage of hot air through the shaft, the said pan being heated by the hot products from the roasting furnace, with means for feeding the ore onto the pan and delivering ore from the pan to the ore roasting furnace, substantially as described.

5. The combination in an ore drier adapted to be mounted upon an ore roasting furnace having a hollow rotating shaft, of a casing, a pan within the casing, a hollow shaft connected to the hollow shaft of the furnace so that it will be rotated by said hollow shaft and will receive hot air from the shaft, blades carried by the said shaft adapted to convey material over the pan, and openings in the shaft at a point between the pan and the bottom of the casing so that the hot air will pass from the shaft into the casing and under the pan, substantially as described.

6. The combination in an ore drier mounted upon an ore roasting furnace having a hollow rotating shaft, of a casing, a pan within the casing, a hollow extension connected to the hollow shaft so that it will be rotated by said hollow shaft and will receive hot air from the shaft, blades carried by the said hollow extension adapted to convey material over the pan, with a central stack and a damper in the hollow extension so that the hot air will pass either into the casing, under the pan to its periphery and over the pan to the central stack, or directly to the stack, substantially as described.

7. The combination in an ore drier adapted to be mounted upon an ore roasting furnace having a hollow vertical shaft, of a casing having a pan, a hollow extension forming a continuation of the shaft of the furnace and coupled to said shaft so that it will turn with it, blades on the hollow extension adapted to convey material over the pan, means for supplying heat to the pan to dry the material, a device for continuously feeding material to the pan, a valved passage forming communication between the pan and the roasting furnace, and a weighted valve in said passage which will allow the material to accumulate in the passage and which will discharge the said material at intervals into the furnace, substantially as described.

8. The combination in an ore drier, of a casing, a pan within the casing, a hollow central shaft, blades on the shaft arranged to convey material over the pan, said shaft having openings between the pan and the bottom of the casing so that hot air introduced into the shaft will pass into the casing, under and around the pan, a stack communicating with the casing, and an inlet and outlet for the material to be dried, substantially as described.

9. The combination in an ore drier, of a casing, a central bearing mounted in the casing, a pan supported by said central bearing and having a flange, a hollow shaft extending through the bearing, a sleeve on the upper part of the shaft, blades carried by the sleeve adapted to convey material from the center of the pan towards its periphery, said shaft having openings communicating with the space under the pan, a damper in the end of the shaft, a stack communicating with the casing so that when hot air is introduced through the hollow shaft it will pass into the casing, under and around the pan to the stack, drying the material and carrying off the moisture, and inlets and outlets for the material, substantially as described.

In testimony whereof, I have signed my name to this specification, in the presence of two subscribing witnesses.

DANIEL T. MacLEOD.

Witnesses:
Wm. E. Shupe,
Wm. A. Barr.